United States Patent [19]

Winkelmann

[11] Patent Number: 5,621,602
[45] Date of Patent: Apr. 15, 1997

[54] SURGE PROTECTOR

[75] Inventor: Bernd D. Winkelmann, Boone, N.C.

[73] Assignee: International Resistive Company, Inc., Boone, N.C.

[21] Appl. No.: 637,827

[22] Filed: Apr. 25, 1996

Related U.S. Application Data

[63] Continuation of Ser. No. 283,615, Aug. 1, 1994, abandoned.

[51] Int. Cl.[6] ................................................. H02H 9/04
[52] U.S. Cl. ........................... 361/104; 361/119; 361/124; 337/188; 337/184; 337/227
[58] Field of Search ...................... 361/119, 124, 361/104; 337/183, 184, 188, 201, 205, 208, 265, 266, 227, 237, 239

[56] References Cited

U.S. PATENT DOCUMENTS 3,139,499  6/1964  Cosgrove ........................... 337/188

OTHER PUBLICATIONS

Application Note Secondary Protectors For Communications Circuits, International Resistive Company, Inc, No date.

Primary Examiner—Todd DeBoer
Attorney, Agent, or Firm—G. Turner Moller

[57]  ABSTRACT

A surge protector includes a housing having therein a wire wound resistor and a fuse separated by a partition wall. In one embodiment for use with high density information transmission, the resistor is of very low value and preferably is 5.6 ohms. The leads from the resistor and fuse are glued in position. The resistor wire is wound about a mandrel and is widely spaced to prevent arcing between adjacent coils of the resistor. A high temperature coating covers the resistor coils and mandrel effectively immobilizing the coils from movement in response to a magnetic field generated when high voltage is applied to the resistor. A cover closes the housing and conceals the components. The housing is empty of potting material.

13 Claims, 1 Drawing Sheet

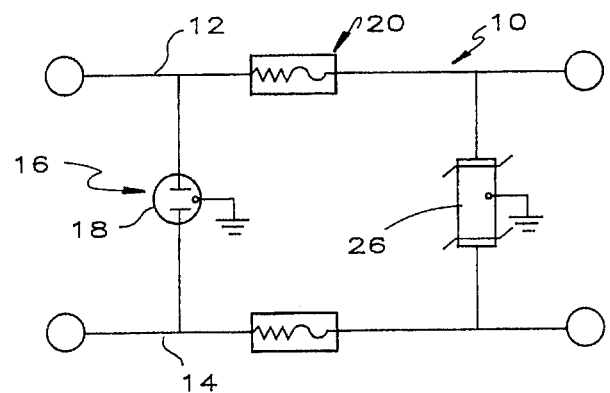
FIG. 1 (PRIOR ART)
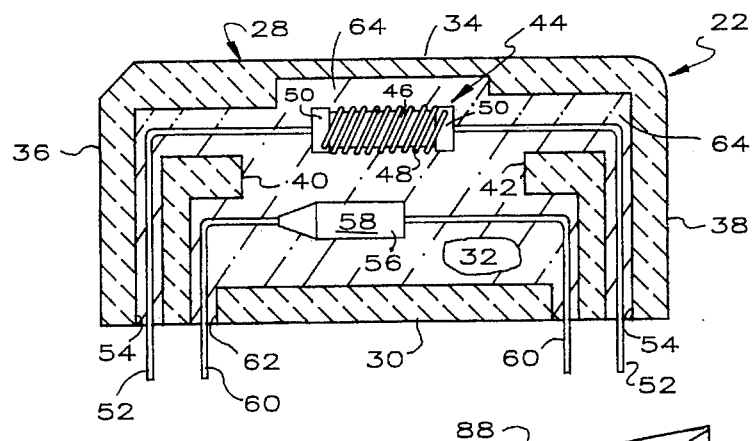
FIG. 2 (PRIOR ART)
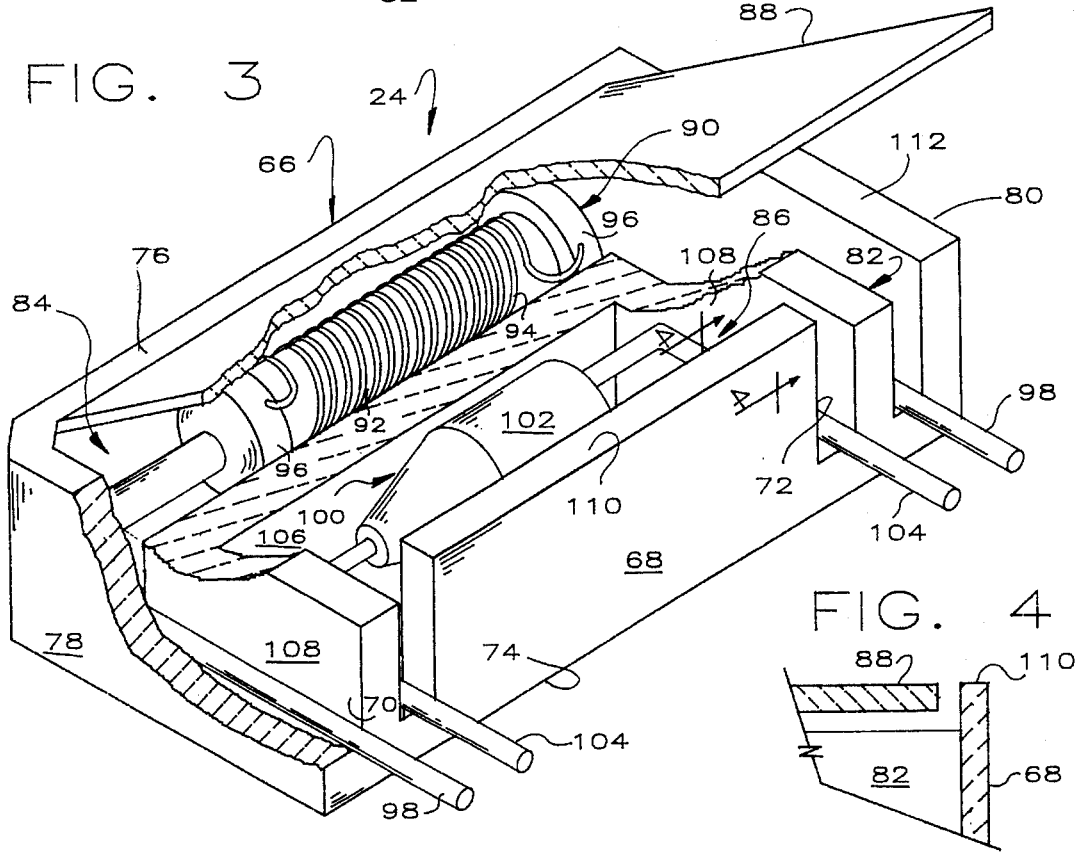
FIG. 3
FIG. 4

SURGE PROTECTOR

This is a continuation of application Ser. No. 08/283,615 filed Aug. 1, 1994, now abandoned.

This invention relates to a surge protector and more particularly to a surge protector of the type incorporated with telephone circuits to protect components.

BACKGROUND OF THE INVENTION

It is known to protect telephone equipment from abnormally high voltages that may be found occasionally on the tip and ring conductors of a subscriber line. These abnormally high voltages are caused by lightning strikes or power crosses, e.g. a conductor falls across a power line and the telephone line to be protected.

There has recently been a development in the telecommunications industry to transmit high density or digital information on existing telephone lines leading to homes. Although fiber optic strands are now widely used in new residential construction, older construction used copper wire. By far the majority of telephone wire leading to residences is copper.

A technological struggle is going on, and will continue, between three industrial groups: telephone companies who want to provide entertainment and other services along with conventional telephone service, cable TV companies who want to provide conventional telephone service and other information related services along with their existing entertainment services and entrepreneurs who wish to provide telephone, entertainment and other services via satellite transmission.

Telephone companies desire to use existing copper wires leading to residences to transmit the high density information needed to deliver entertainment and other services. It makes much more sense to modify existing telephone equipment rather than pay the tremendous cost, and suffer the delay, of rewiring most existing neighborhoods. One problem that has occurred involves the surge protection system currently used to prevent damage to circuit board components in central offices. A substantially identical surge protection system is envisioned for high density applications to prevent damage to circuit board components at central offices, adjacent residences and on repeaters between central offices and residences.

Conventional surge protection systems have two or more stages of surge protection: a primary stage provided by a gas discharge device and a secondary stage incorporating conventional surge protectors which are the predecessor of this invention and which provide a 20–100 ohm resistor adjacent a meltable fuse. For years, applicant's assignee and others have supplied secondary stage surge protectors comprising a housing, a 20–100 ohm wound wire resistor, a fuse and a potting cement filling the housing and encapsulating the resistor and fuse.

Considerable effort has been spent by telecommunications companies to determine the optimum or desirable resistance of the secondary surge protector resistor. All evidence points to values less than 10 ohms and the presently preferred value is 5.6 ohms.

At the outset, prototype surge protectors were made using conventional technology except the resistor was modified to be 5.6 ohms rather than the more conventional 20–100 ohms and then tested to determine if they were satisfactory. They were not.

When the voltage potential across the resistor is sufficient to create a current surge, the resistor either heats up rapidly and breaks at high current or heats up slowly and melts the fuse at a lower current. Conventional surge protectors having 5.6 ohm resistors failed the appropriate test because they essentially exploded during some test of the procedure. This produces a fire hazard, potentially damages an expensive circuit board from fire or fragmentation and is manifestly unacceptable.

The procedure used to determine whether a particular surge protector is adequate is known as Bell Spec TR-1089. Bell Spec TR-1089, incorporated herein by reference, is a complicated test procedure, about 30 pages long, designed to determine whether a particular surge protector is adequate to handle a variety of events that can damage telephone equipment. There are two events the surge protector must handle: lightning strikes and power crosses, e.g. a conductor falls across a live power line and a telephone line. To satisfy the lightning strike requirement, the surge protector must accept, and still work after, the tests shown in Table I:

TABLE I

| Lightning |
| --- |
| 1000 volts - 10/1000 usec pulse - 25 hits each polarity |
| 2500 volts - 2/10 usec pulse - 10 bits each polarity. |

The power cross requirements are considerably more complicated and are summarized in Table II:

TABLE II

| Power Cross |
| --- |
| 1. First Level - line simulation fuse (MDQ 1–6/10 amps) in series with test resistor - fuse should not open during tests |
| 50 volts - 150 ohms series resistance - 15 minutes - stay in spec |
| 100 volts - 600 ohms series resistance - 15 minutes - stay in spec |
| 200, 400, 600 volts - 600 ohms series resistance - 60 applications - stay in spec |
| 100 volts - 1000 ohms series resistance - 60 applications - stay in spec |
| 2. Second Level |
| 120 volts - 25 amps - 15 minutes - open circuit or stay in spec |
| 277 volts - 25 amps - 15 minutes - open circuit or stay in spec |
| 600 volts - 60 amps - 5 seconds - open circuit |
| 600 volts - 40 amps - 5 seconds - open circuit |
| 600 volts - 7 amps - 5 seconds - open circuit |
| 100 to 600 volts - 2.2 amps at 600 volts - 15 minutes - open circuit or stay in spec |

SUMMARY OF THE INVENTION

This invention comprises a surge protector having a wound wire resistor and a thermal fuse. The resistor and fuse are positioned in a housing having a U-shaped partition wall dividing the housing into a generally U-shaped resistor chamber and a smaller fuse chamber. The partition wall separates the resistor and fuse and provides considerable dielectric strength eliminating arcing between the resistor and fuse under test conditions. Preferably, the housing and partition wall are made of a ceramic material so the wall is an integral part of the housing, is made at the same time as the housing and involves no labor or machine time to assemble. In contrast to the prior art device, no potting cement encapsulates the resistor and fuse.

The housing is the same size and shape as the conventional surge protector. When assembled on a conventional circuit board, the device sits on a rather thin edge which is necessarily the bottom. The leads from the fuse and resistor exit through the bottom of the surge protector and connect to a circuit board in a conventional manner. The leads from the fuse and resistor are preferably adhesively secured to the housing. The resistor is wound on a mandrel in rather wide spacing to prevent arcing between adjacent wraps of the resistor during lightning strike tests. A high temperature coating is applied to the resistor and mandrel to prevent movement of the resistor coils in response to an electromagnetic field generated when the coil is exposed to high voltages. The coating is either inorganic or of such high temperature capability that it does not become conductive below about 300° C., and preferably below 400° C., and thereby affect the resistivity of the resistor. A removable lid is applied to the housing to conceal the components. The surge protector of this invention is essentially the same size and presents the same external configuration as the device which it replaces. Thus, in some retrofit situations, the conventional surge protector may be removed from a circuit board and the surge protector of this invention installed in its place.

Although the surge protector of this invention was designed to provide a low resistivity resistor compatible with high density information transmission over copper telephone wires, it has the surprising advantage of being superior to conventional surge protectors at higher resistivity values, such as the conventional 20–100 ohm range. The surge protectors of this invention pass Bell Spec TR-1089 lightning and power cross tests with no ill effects.

The industry has manufactured millions of the conventional surge protectors and, in the process, has driven manufacturing costs to quite low levels. It is likely that the learning curve will allow the cost of this invention to shortly equal, or fall below, the cost of the conventional device.

It is accordingly an object of this invention to provide an improved surge protector which is particularly useful in telephone circuits.

Another object of this invention is to provide a surge protector having a fuse and a low resistivity resistor.

A further object of this invention is to provide a surge protector which readily passes industry tests for telecommunications service.

These and other objects of this invention will become more fully apparent as this description proceeds, reference being made to the accompanying drawings and appended claims.

BRIEF DESCRIPTION OF THE DRAWINGS

FIG. 1 is a schematic drawing of a conventional telephone surge protection circuit;

FIG. 2 is a sectioned side view of a conventional secondary surge protector;

FIG. 3 is an isometric view of a secondary surge protector of this invention, certain parts being broken away for clarity of illustration; and FIG. 4 is a partial cross-sectional view of the surge protector of FIG. 3, taken substantially along line 4—4 thereof as viewed in the direction indicated by the arrows.

DETAILED DESCRIPTION

Referring to FIG. 1, a typical central office surge protection circuit 10 comprises a tip conductor 12, a ring conductor 14 and a primary surge protector stage 16 comprising a gas tube 18 connecting the conductors 12, 14.

The secondary surge protector stage 20 comprises either a conventional surge protector 22 or a surge protector 24 of this invention in each of the conductors 12, 14 and a solid state surge protector 26 connected across the conductors 12, 14.

The conventional surge protector 22 comprises a ceramic housing 28 having an open side or open top, depending on one's orientation of the device. As used herein, a wall 30 is the bottom because, in use, the device 22 is placed on a circuit board (not shown) with the wall 30 down. The housing 28 also comprises one side wall 32, a top wall 34, end walls 36, 38 and a pair of L-shaped positioning abutments 40, 42. The abutments 40, 42 extend upwardly only part of the depth of the end walls 36, 38. The conventional housing 28 is slightly more than one inch long, slightly less than one half inch high and about one quarter inch thick.

A resistor 44 comprises a ceramic mandrel 46, a wound resistor wire 48 connected at opposite ends to metal end caps 50 and a pair of L-shaped leads 52 extending out of a series of aligned openings 54 in the housing bottom wall 30. The resistor 44 has typically shown a resistance between 20–100 ohms.

A fuse 56 of conventional design resides between the resistor 44 and the bottom wall 30. The fuse 56 includes a fuse body 58 incorporating a drop of metal alloy or other suitable material designed to melt at a predetermined temperature and open a circuit between a pair of L-shaped leads 60. The fuse 56 may be of any suitable type and one preferred embodiment is known as a Model MicroTemp 74-K-184-ADAQL (184° C. fuse), available from Therm-O-Disc, Inc. of Mansfield, Ohio. It will be apparent that the selected melting temperature of the fuse 56 may vary substantially, but in the case of commercially available 20–100 ohm surge protectors, the fuse 56 has been selected to open at 184° C. The fuse leads 60 extend through openings 62, aligned with the openings 54, in the bottom wall 30.

A potting material 64 fills the housing 28 up to the height of the end walls 34, 36 thereby covering the positioning abutments 40, 42, fixing the resistor 44 and fuse 56 in place and providing controlled and desirable heat transfer characteristics to the surge protector 22. The potting material 64 provides essentially no dielectric strength. The potting material 64 also effectively glues the wire 48 in place to prevent movement of the resistor coils in response to an electromagnetic force induced by current in the coils. Those skilled in the art will recognize the surge protector 22 as exemplary of commercially available 20–100 ohm devices that have been widely used in the recent past. In the event any additional information is needed relative to the surge protector 22, reference is made to relevant publications of International Resistive Company, Inc., Boone, N.C., such as "Application Note SECONDARY PROTECTORS FOR COMMUNICATIONS CIRCUITS".

Referring to FIG. 3, the surge protector 24 of this invention comprises a ceramic housing 66 essentially the same overall size and footprint as the housing 28. The housing 66 comprises a bottom wall 68 having a series of aligned openings 70, 72, one side wall 74, a top wall 76, end walls 78, 80 and a U-shaped partition wall 82 dividing the interior of the housing 66 into a resistor chamber 84 and a fuse chamber 86. A cover or lid 88 closes the open side of the housing 66 sufficiently to conceal the interior.

A resistor 90 comprises a ceramic mandrel 92 of the same diameter as the mandrel 46, a wound resistor wire 94 connected at opposite ends to metal end caps 96 and a pair of L-shaped leads 98 extending out of the openings 70 in the housing bottom wall 68. The coils of the resistor wire 94 are much farther apart than in the resistor 44. The preferred spacing between the coils of the resistor wire 94 depends on the resistive value of resistor 90 and the diameter of the wire 94 as will be apparent to those skilled in the art. Generally, as the resistance value declines, the coils are spaced farther apart. Spacing the coils farther apart reduces the likelihood of arcing between the coils during lightning strike tests. For a surge protector having a resistance of 5.6 ohms, a suitable selection of variables includes a resistor wire of 0.008" diameter, a pitch of 36, 17.9 turns or wraps around the mandrel and a spacing between the coils of D spacing 3.5. In a surge protector having a resistance of 5.6 ohms, it will be seen that the mandrel 92 is longer so the coils can be spaced farther apart.

An insulating inorganic coating or an insulating high temperature organic coating is applied to the resistor wire 94 and mandrel 92 to effectively glue the wire 94 in place to prevent movement of the resistor coils in response to an electromagnetic force induced by current in the coils. The coating is selected to avoid becoming conductive during test conditions and thereby change the resistance of the resistor 90. A variety of compounds were tested and a silicone type coating known as SC-004-A from Wacker Silicones Corporation of Adrian, Mich. proved quite acceptable. It is believed that typical organic coatings become conductive, and are therefore unsuitable, because they carbonize at temperatures achieved during testing. In a desirable coating, no substantial carbonizing occurs below about 300° C. and, in a preferred coating, no substantial carbonizing occurs below about 400° C.

A fuse 100 of conventional design resides in the fuse chamber 86. The fuse 100 includes a fuse body 102 incorporating a drop of metal alloy or other suitable material designed to melt at a predetermined temperature and open a circuit between a pair of L-shaped leads 104. The fuse 100 may be of any suitable type and one preferred embodiment is known as Model MicroTemp KCMBAM-G7FO4 (110° C. fuse), available from Therm-O-Disc., Inc. of Mansfield, Ohio. It will be apparent that the selected melting temperature of the fuse 100 may vary substantially, but in the case of the 5.6 ohm surge protector, the fuse 100 has been selected to open at 110° C. The fuse leads 104 extend through the openings 72 in the bottom wall 68.

The resistor and fuse leads 98, 104 are adhesively attached, with a few drops of glue adjacent the outlet openings 70, 72, to the ceramic housing 66 to prevent the resistor 90 and the fuse 100 from moving. Any suitable adhesive is satisfactory, such as L210 available from Mavidon Corporation of Palm City, Fla.

The partition wall 82 includes a panel 106 separating the resistor 90 from the fuse 100 and a pair of panels 108 separating the resistor leads 98 from the fuse leads 104. The partition wall 82 is preferably of ceramic material formed simultaneously with the rest of the ceramic housing 66 thereby avoiding manufacturing, handling and assembling costs of a separate element. The cover 88 is preferably parallel to the side wall 74. Accordingly, the surface 110 may be coplanar with the surface 112 and the cover 88 rests on the partition wall 82 as shown in FIG. 4. The partition wall 82 is accordingly of sufficient height to reach the cover 88. The cover 88 is glued in place with a few drops of a conventional adhesive such as L210 available from Mavidon Corporation of Palm City, Fla.

The resistor and fuse chambers 84, 86 are free of a potting material comparable to the material 64 so the chambers 84, 86 contain only the resistor 90, the fuse 100, the adhesive securing the leads 98, 104 to the housing 66 and air. The partition wall 82 provides considerable dielectric strength between the resistor 90 and the fuse 100 and dictates to a considerable extent the rate of heat transfer from the resistor 90 to the fuse 100.

In a 5.6 ohm version, the surge protector of this invention is the same size as prior art devices, presents the same external configuration so it can replace prior art 20–100 ohm devices on a circuit board, allows high speed transmittal of high density information and passes the Bell Spec TR-1089 at a cost comparable to the prior art device.

Although this invention has been disclosed and described in its preferred form with a certain degree of particularity, it is understood that the present disclosure of the preferred form is only by way of example and that numerous changes in the details of construction and operation and in the combination and arrangement of parts may be resorted to without departing from the spirit and scope of the invention as hereinafter claimed.

I claim:

1. A circuit protection device designed to protect a pair of electrical conductors by opening at such time as an overcurrent condition occurs in one of the conductors, the device comprising a ceramic housing having an interior compartment and a partition wall dividing the compartment into a resistor chamber providing a pair of resistor lead openings and a fuse chamber providing a pair of fuse lead openings;

a resistor assembly in the resistor chamber having a resistance of less than about 10 ohms, a first lead extending through one of the resistor lead openings and a second lead through another of the resistor lead openings; and a fuse in the fuse chamber having a first lead extending through one of the fuse lead openings and a second lead extending through another of the fuse lead openings;

an adhesive attaching the resistor leads and the fuse leads to the housing;

the resistor and fuse chambers being free of a potting material;

the circuit protection device will continue to protect after accepting simulated lightening strikes which comprise applying: 1000 volts at $10/1000$ usec pulse for 25 hits each polarity, and 2500 volts at $2/10$ usec pulse for 10 hits each polarity.

2. The device of claim 1 wherein the partition wall is U-shaped, the resistor chamber is U-shaped and the fuse chamber is straight.

3. The device of claim 2 wherein the fuse does not open with a $15/10$ amp fuse in series with the circuit protection device in a test when:

a voltage of 50 volts is applied for 15 minutes to the circuit protection device having an additional series resistance of 150 ohms, a voltage of 100 volts is applied for 15 minutes to the circuit protection device having an additional series resistance of 600 ohms, a voltage of 200, 400 or 600 volts is applied for 60 applications to the circuit protection device having an additional series resistance of 600 ohms, and a voltage of 100 volts is applied to 60 applications to the circuit protection device having an additional series resistance of 1000 ohms.

4. The device of claim 1 wherein the resistor comprises a dielectric mandrel and a resistor wire wound on the mandrel and a coating affixing the resistor wire to the mandrel against movement of the resistor wire in response to an electromagnetic field generated by current in the wire.

5. The device of claim 4 wherein the coating has the property of not conducting below about 300° C.

6. The device of claim 5 wherein the coating has the property of not conducting below about 400° C.

7. The device of claim 5 wherein the coating is a silicone coating.

8. The device of claim 1 wherein the partition wall is of a ceramic material integral with the housing.

9. The device of claim 1 wherein the housing provides a bottom wall through which the lead openings extend, a side wall, a top wall, a pair of end walls and a front wall adhesively affixed to the housing and abutting the partition wall throughout a substantial part of the length thereof.

10. A circuit protection device designed to protect a pair of electrical conductors by opening at such time as an overcurrent condition occurs in one of the conductors, the device comprising a ceramic housing having a bottom wall and an interior compartment providing first and second pairs of aligned lead openings in the bottom wall, a U-shaped partition wall dividing the compartment into a U-shaped resistor chamber opening through the first lead openings and an elongate fuse chamber opening through the second lead openings;

a resistor assembly in the resistor chamber having a wound wire resistor, a first L-shaped lead extending through one of the first pair of lead openings and a second L-shaped lead extending through another of the first pair of lead openings;

a coating affixing the resistor wire to the mandrel against movement of the resistor wire in response to an electromagnetic field generated by current in the wire, the coating having the property of not conducting below about 300° C.;

a fuse in the fuse chamber having a fuse body providing first and second ends, a first L-shaped lead extending from the first fuse end through one of the second lead openings and a second L-shaped lead extending from the second fuse end through another of the second lead openings and means adhesively attaching the first and second fuse leads to the housing;

the resistor and fuse chambers being free of a potting material.

11. The device of claim 10 wherein the partition wall is of a ceramic material integral with the housing.

12. The device of claim 11 wherein the housing provides a bottom wall through which the lead openings extend, a back wall, a top wall, a pair of end walls and a front wall adhesively affixed to the housing and abutting the partition wall throughout a substantial part of the length thereof.

13. The device of claim 12 wherein the coating is a silicone coating.

* * * * *